United States Patent [19]
Gates

[11] Patent Number: 5,729,719
[45] Date of Patent: Mar. 17, 1998

[54] SYNCHRONIZATION CIRCUIT FOR CLOCKED SIGNALS OF SIMILAR FREQUENCIES

[75] Inventor: Stillman F. Gates, Los Gatos, Calif.

[73] Assignee: Adaptec, Inc., Milpitas, Calif.

[21] Appl. No.: 301,510

[22] Filed: Sep. 7, 1994

[51] Int. Cl.[6] .................................................. G06F 1/12
[52] U.S. Cl. ................................................................ 395/550
[58] Field of Search ............................. 395/550, 200.14, 395/200.19, 250, 845, 878, 881, 285, 298, 305; 364/270, 271, 271.1, 271.2, 271.5, 271.6, 143, 238.6, 239, 239.1, 240.2, 269; 348/536, 537; 327/141, 142, 145, 153, 161, 172, 176, 261, 263; 370/105.5, 108

[56] References Cited

U.S. PATENT DOCUMENTS

| | | | |
|---|---|---|---|
| 5,036,221 | 7/1991 | Brucculeri et al. | 307/443 |
| 5,291,529 | 3/1994 | Crook et al. | 375/109 |
| 5,450,458 | 9/1995 | Price et al. | 375/356 |
| 5,487,163 | 1/1996 | Keeley | 395/550 |

OTHER PUBLICATIONS

Data Book, Preliminary, AIC-7870 PCI Bus Master Single-Chip SCSI Host Adapter, Adaptec, pp. 1-1 through 1-8, 5-1 through 5-27, 9-1 through 9-26, 10-1 through 10-12 and 11-1 through 11-6, Dec., 1993.

Data Book, Preliminary, AIC-7850 PCI Bus Master Single-Chip SCSI Host Adapter, Adaptec, pp. 1-1 through 1-6, 5-1 through 5-20, 9-1 through 9-17 and 10-1 through 10-12, Feb., 1994.

Joseph D. Greenfield, "Practical Digital Design Using Ics", John Wiley & Sons, 1983, pp. 165-168 and 173-175.

Primary Examiner—Thomas M. Heckler
Assistant Examiner—Dennis M. Butler
Attorney, Agent, or Firm—Skjerven, Morrill, MacPherson Franklin & Friel; Forrest E. Gunnison; Omkar K. Suryadevara

[57] ABSTRACT

In accordance with this invention, a synchronization circuit generates a synchronized signal and a synchronized clock from an input signal and a clock signal. The synchronization circuit is insensitive to the clock signal prior to and during a predetermined time period after the occurrence of a leading edge in the synchronized signal, thus avoiding the metastable problem. The synchronized signal has a leading edge derived from a leading edge in the input signal and a trailing edge in synchronization with a trailing edge in the synchronized clock. The synchronized clock has a leading edge derived from a leading edge in the clock signal and a trailing edge derived from a trailing edge in the clock signal. One embodiment of a synchronization circuit is used in a host adapter integrated circuit which buffers data between a system bus and an input/output bus. The system bus clock signal is supplied as the input signal and the host adapter's clock signal is supplied as the clock signal to the synchronization circuit. The synchronized signal and the synchronized clock are then used to drive a data FIFO queue in the host adapter.

23 Claims, 9 Drawing Sheets

SYNCHRONIZATION CIRCUIT FOR CLOCKED SIGNALS OF SIMILAR FREQUENCIES

FIELD OF THE INVENTION

This invention generally relates to synchronization circuits and in particular to a synchronization circuit that synchronizes clocked signals from an input/output bus and a system bus having similar frequencies while eliminating any possibility of metastable conditions.

BACKGROUND OF THE INVENTION

In synchronizing two clocked signals of similar frequencies, one clock signal can arrive during the setup time of the other clock signal being sampled, resulting in a metastable problem.

FIG. 1A illustrates the setup time 101 (in number of gate delays) required for a signal 100 to pass through a multi-level logic circuit, such as a flip-flop. For example, a setup time of at least two gate delays is required before signal 100 can be clocked to output terminal Q of a flip-flop. If a flip-flop is triggered during the setup time, an unpredictable output can occur at output terminal Q and also output terminal NQ of the flip-flop due to the well-known metastable problem.

FIG. 1B illustrates a prior art synchronization circuit 120. Synchronization circuit 120 includes a first flip-flop 121, a gate 122, and a second flip-flop 123 and synchronizes an input signal SIGIN to a clock signal CLK. Flip-flop 121 clocks signal SIGIN at input terminal D to output terminal Q that is connected to an input terminal of gate 122, in response to a rising edge in signal CLK. Gate 122 combines signal SIGIN with the signal from flip-flop 121 and drives a signal on input terminal D of flip-flop 123. Flip-flop 123 clocks the signal at input terminal D to output terminal Q as signal SYNCSIGOUT in response to a rising edge in signal CLK. Both flip-flops 121 and 123 are reset by active low signal RESET-. Synchronization circuit 120 synchronizes signal SIGIN to signal CLK when the minimum period of signal CLK is larger than the sum (metastable period of flip-flop 121+delay of gate 122+set-up time of flip-flop 123).

One application where a metastable problem can occur is in a data FIFO queue of a host adapter card that couples an input/output bus to a system bus, when the two buses have different speeds.

FIG. 2A illustrates a computer system 200 including a host adapter integrated circuit 214 which is described in co-pending and commonly assigned U.S. patent application Ser. No. 07/964,532 titled "Intelligent SCSI Bus Host Adapter Integrated Circuit" filed Oct. 16, 1992 by Craig A. Stuber et al. and is incorporated by reference herein in its entirety.

Computer system 200 includes SCSI #1 peripheral device 261, and SCSI #2 peripheral device 262 that are both connected to input/output bus 250 that is in this example a SCSI bus, which in turn is connected to host adapter integrated circuit 214 of host computer 210. Host computer 210 includes a host microprocessor 211, host memory 212, and host adapter integrated circuit 214 connected to a system bus 213. System bus 213 can be any host computer bus such as an ISA bus or an EISA bus.

Host adapter integrated circuit 214 forms a high speed data path for transfer of data between system bus 213 and input/output bus 250. Host adapter integrated circuit 214 includes a SCSI module 215, a sequencer 216, a memory 217, a host interface module 218 and a data FIFO queue 220 that are all interconnected by bus structure 219. Host interface module 218 in conjunction with sequencer 216 provides functional control to operate host adapter integrated circuit 214 as a bus slave or a bus master which transfers data and commands between system bus 213 and bus structure 219. Host interface module 218 also provides synchronization between the system bus clock, for example at 8.33 MHz (120 nanoseconds) and a host adapter clock, for example at 40 MHz (25 nanoseconds). SCSI Module 215 in conjunction with sequencer 216 handles all normal SCSI phase sequences and controls direct memory access (DMA) transfers as well as programmed input output (PIO) data transfers. Transfers on input/output bus 250 are referenced to the host adapter clock that is generated from a clock generator (not shown) on host adapter integrated circuit 214.

Data FIFO queue 220 is a data first-in-first-out (FIFO) queue which keeps data streaming between buses of different speeds by data buffering. Data FIFO queue 220 ensures minimal host burst time usage by bursting data at the system bus maximum rate or SCSI bus maximum rate, whichever bus is faster. Sequencer 216 controls the operations of the various components of host adapter integrated circuit 214 including host interface module 218 and SCSI Module 215.

FIG. 2B illustrates a signal interface of data FIFO queue 220 showing the input and output signals described in detail in the U.S. patent application, Ser. No. 07/964,532 referenced above, and described briefly herein. A clock signal HDFDATCLK that is referenced to the clock of system bus 213 is used by host interface module 218 for reading and writing to data FIFO queue 220. Both read and write accesses to input/output bus 250 are synchronized to a rising edge of host adapter clock HCLKH, which is the same edge that SCSI module 215 uses for data FIFO queue accesses. A synchronization circuit 218S (FIG. 2) inside host interface module 218 performs the necessary synchronization between clock signal HDFDATCLK and rising edge of host adapter clock HCLKH. Depending on the operation involved, the rising, i.e. leading, edge of clock signal HDFDATCLK initiates a write or read operation. The falling edge of clock signal HDFDATCLK latches the data in the memory and also increments the data FIFO memory write or read counter. Registers in data FIFO queue 220 are incremented by clock signal HDFDATCLK during host interface module bus master 32 bit transfers to data FIFO queue 220 from host memory 212.

Different speeds of system bus clock and host interface clock can cause a metastable problem in host interface module 218 if a signal is sampled during its setup time (FIG. 1). Such a metastable problem is avoided by using multiple clock edges to sample the same signal, because the clock's speed is a multiple of the signal's speed. In one prior art system, there are at least four host adapter clock cycles of 25 nanoseconds at 40 MHz for each system bus clock cycle of 120 nanoseconds at 8.3 MHz. Therefore, if a signal is being set up when the first clock edge comes in, the resulting metastable value is corrected at the second clock edge.

However, when the clock of system bus 213 is increased to 33.3 MHz and the host adapter clock is fixed at 40 MHz, the multiple sampling scheme for avoiding the metastable problem cannot be used because there can be only one host adapter clock cycle of 25 nanoseconds for every system bus clock cycle of 30 nanoseconds. Moreover, the close relationship of the two clocks requires synchronization timing to be very precise. In such a system, host interface module 218 does not have sufficient time to wait for a status signal from data FIFO queue 220. Even if host interface module 218 buffers data locally and has two host adapter clock cycles to access data FIFO queue 220, a feedback status signal must be returned to host interface module 218 from data FIFO queue 220 in less than two system bus cycles, within 52 nanoseconds of each access, because 8 nanoseconds of setup time is required by host interface module 218 to determine when the next access is to be made.

While synchronization of an asynchronous signal to a clocked signal and synchronization of two clocked signals over a number of cycles is well known in the art, applicant is unaware of a circuit for synchronizing two clocked signals of similar speeds in less than two clock cycles. Consequently, when the prior art synchronization circuit is used with clock signals having similar frequencies, random double address advances are observed instead of single address advances in the data FIFO queue 220 as well as a missed access when the data FIFO queue 220 has not recovered from a previous access. Recovery from a previous access is delayed, for example, if a circuit's recovery occurs at the next clock edge. Errors due to the metastable problem and/or the missed access problem can result in a complete halt of the transfer of data between a host microprocessor and a peripheral. Consequently, the prior art synchronization circuit is not suitable for use between a PCI system bus and a SCSI input/output bus for example.

SUMMARY OF THE INVENTION

In accordance with this invention, a synchronization circuit replaces an input signal and a clock signal, which have frequencies different from each other, with a synchronized signal and a synchronized clock. The synchronized clock has a leading edge derived from a clock signal leading edge and a trailing edge derived from the clock signal trailing edge. The synchronized signal has a leading edge derived from a leading edge of the input signal and a trailing edge in synchronization with the trailing edge of the synchronized clock. Synchronization of the trailing edges of the synchronized signal and the synchronized clock allows data to be written to a random access memory (RAM). The synchronized clock's leading edge is generated by the synchronization circuit only after passage of at least a predetermined time period after generation of the synchronized signal's leading edge, to avoid a metastable problem.

The synchronization circuit holds a storage element, in one embodiment a flip-flop, in reset for the duration of the predetermined period, while the input signal is applied to an input terminal of the storage element. Hence, the synchronization circuit is insensitive to the clock signal prior to and during the predetermined time period. A predetermined time period, greater than the setup time of the synchronization circuit is selected to avoid the metastable problem. Hence a metastable problem in a flip-flop is avoided by using the reset function of the same flip-flop for the predetermined time period, until the precharging time, i.e. setup time of the flip-flop is satisfied.

In one embodiment, the synchronization circuit is used on a host adapter integrated circuit with a system bus clock signal as the synchronization circuit's input signal and the host adapter's clock signal as the synchronization circuit's clock signal. The synchronized signal trailing edge is used to read from or write into the data FIFO queue of the host adapter integrated circuit. The synchronized clock is used in the control circuitry of the data FIFO queue.

The synchronization circuit includes a leading edge detector and a signal generator. The leading edge detector has a signal input line, a reset input line, an output terminal and a delayed output terminal, i.e., a plurality of input lines and a plurality of output terminals. In response to a leading edge on the signal input line, the leading edge detector drives a signal on its output terminal connected to a first input line of the signal generator active and after passage of a predetermined period, a signal on its delayed output terminal connected to an enable input line of the signal generator active.

The signal generator has a second input line, a synchronized signal output terminal and a synchronized clock output terminal, in addition to the first input line and the enable input line, i.e., a plurality of input lines and a plurality of output terminals. In response to a leading edge on the signal generator's first input line, the signal generator provides a leading edge on the synchronized signal output terminal.

The synchronization circuit's clock signal drives the second input line of the signal generator. In response to a first triggering edge, henceforth first edge, on the second input line after the signal on the enable input line goes active, the signal generator provides a leading edge on the synchronized clock output terminal. Subsequent to the leading edge, the signal generator generates a trailing edge on both, the synchronized signal output terminal and synchronized clock output terminal, in response to a second edge on the signal generator second input line. Therefore, the leading edge on the synchronized clock output terminal is provided only after passage of the predetermined time period after generation of a leading edge on the synchronized signal output terminal.

In this embodiment, the signal generator also includes a reset output terminal which is connected to a reset input line of the leading edge detector. The signal generator drives the signal on the reset output terminal active simultaneously with the generation of the trailing edge on the synchronized signal output terminal and synchronized clock output terminal. In response to the active signal on its reset input line, the leading edge detector drives a signal on the delayed output terminal inactive which in turn resets the signal generator. When reset, the signal generator ignores the clock signal on the second input line, until the signal on the enable input line goes active which occurs only after a predetermined period after the leading edge detector senses a leading edge in its input signal.

The leading edge detector includes a signal leading edge trigger circuit and a delay circuit. The signal leading edge trigger circuit has an input terminal and an output terminal. In response to a leading edge on the signal leading edge trigger circuit's input terminal connected to the leading edge detector's signal input line, the signal leading edge trigger circuit drives a signal on its output terminal connected to the leading edge detector's output terminal active.

The delay circuit has an input line, a reset input line and an output terminal. The delay circuit responds to an active signal on its input line connected to the signal leading edge trigger circuit's output terminal by driving a signal on its output terminal connected to the leading edge detector's delayed output terminal active after passage of the predetermined time period as measured from the time the signal goes active on its input line.

The signal leading edge trigger circuit is implemented, in one embodiment, by a flip-flop. A rising edge in the input signal at the clock input terminal of the flip-flop clocks a power supply voltage at its D input terminal to its Q output terminal and so drives a signal on the signal leading edge trigger circuit's output terminal active.

The delay circuit is implemented, in one embodiment, by two flip-flops connected in tandem. A rising edge on the delay circuit's input line causes the first flip-flop, after a flip-flop delay (2 gate delays), to clock a power supply voltage to the clock input of the second flip-flop. The second flip-flop in turn, after another flip-flop delay (2 gate delays), clocks a power supply voltage to the delayed output terminal. Therefore, the delay circuit inserts two flip-flop delays (i.e. four gate delays) between an active signal on the leading edge detector's output terminal and delayed output terminal.

In this embodiment, the signal generator includes a clock leading edge trigger circuit, a clock trailing edge trigger circuit, a synchronized signal logic element and a synchronized clock logic element. The clock leading edge trigger circuit has a first input terminal, a second input terminal, an enable input terminal and first and second output terminals. The clock leading edge trigger circuit is initially insensitive to signals on its second input terminal that is connected to the signal generator's second input line. When the first input terminal and the enable input terminal connected to the first input line and enable input line respectively, are driven active, a first edge on the second input terminal, clock leading edge trigger circuit drives a signal on the first output terminal connected to a first input terminal of the synchronized clock logic element active and a signal on the second output terminal connected to a disable input terminal of the clock trailing edge trigger circuit inactive. Therefore, the signal generator is sensitive to signals on the second input line only after the predetermined time period measured from the time the leading edge detector provides a leading edge on its output terminal, which corresponds to a leading edge in the input signal.

In one embodiment, the clock leading edge trigger circuit is implemented by a D-type flip-flop having an asynchronous reset terminal. The flip-flop is held in reset, while the leading edge in the input signal of the synchronization circuit is applied to the flip-flop's input terminal D for the predetermined time period. After the predetermined time period, the flip-flop is no longer held in reset and so clocks the signal at input terminal D at the next triggering edge in the signal at its clock input terminal. The clock leading edge trigger circuit also includes an inverter, wherein the inverter's input terminal is driven by the clock signal of the synchronization circuit and the inverter's output terminal is connected to the flip-flop's clock input terminal. Hence the flip-flop is sensitive to a falling edge in the clock signal, in one embodiment.

The clock trailing edge trigger circuit has a clock input terminal, an output terminal and a reset output terminal, in addition to a disable input terminal. While the signal input terminal of the clock trailing edge trigger circuit has an inactive signal (e.g. a low signal), the clock trailing edge trigger circuit responds to an active signal (e.g. a trailing edge) on the clock input terminal by driving a signal on its output terminal connected to second input terminals of synchronized signal logic element and synchronized clock logic element active and a signal on its reset output terminal connected to the leading edge trigger circuit's reset input line active and otherwise ignores the signals on its clock input terminal. In one embodiment, the clock trailing edge trigger circuit is implemented by a D-type flip-flop having an asynchronous reset terminal and an inverter, wherein the inverter's output is connected to the flip-flop's D input terminal and reset input terminal.

The synchronized signal logic element has an output terminal, which is also the synchronized signal output terminal, in addition to the first and second input terminals. The synchronized signal logic element masks the signal on its first input terminal when the second input terminal has an active signal and otherwise passes the signal on its first input terminal therethrough.

The synchronized clock logic element has an output terminal, which is also the synchronized clock output terminal, in addition to the first and second input terminals. The synchronized clock logic element masks the signal on its first input terminal when the signal on the second input terminal is active and otherwise passes the signal on its first input terminal therethrough. Therefore, the clock trailing edge trigger circuit causes a trailing edge in the signals on the output terminals of the synchronized signal logic element and synchronized clock logic element to appear simultaneously, i.e., synchronized.

Also, an active signal on the reset input line of the leading edge trigger circuit causes the internal components of the leading edge detector to be reset, in a predefined order to avoid generation of false signals on the output terminals of synchronized signal logic element and synchronized clock logic element and so causes the clock leading trigger circuit and the clock trailing edge trigger circuit to also be reset. When reset, clock trailing edge trigger circuit drives a signal on its output terminal inactive and thus enables the synchronization circuit to respond to the next leading edge in its input signal.

DETAILED DESCRIPTION

A synchronization circuit in accordance with this invention replaces an input signal and a clock signal of different frequencies by a synchronized signal and a synchronized clock which have leading edges separated by at least a predetermined time period and trailing edges which are synchronized. The synchronization circuit avoids the metastable problem caused by a clock triggering edge occurring during the setup time for the input signal's leading edge. The synchronization circuit holds a storage element in reset for the duration of the predetermined period while the input signal is applied to an input terminal of the storage element, so that the storage element clocks a stable value at the next triggering edge in the clock signal.

Figure 1A:
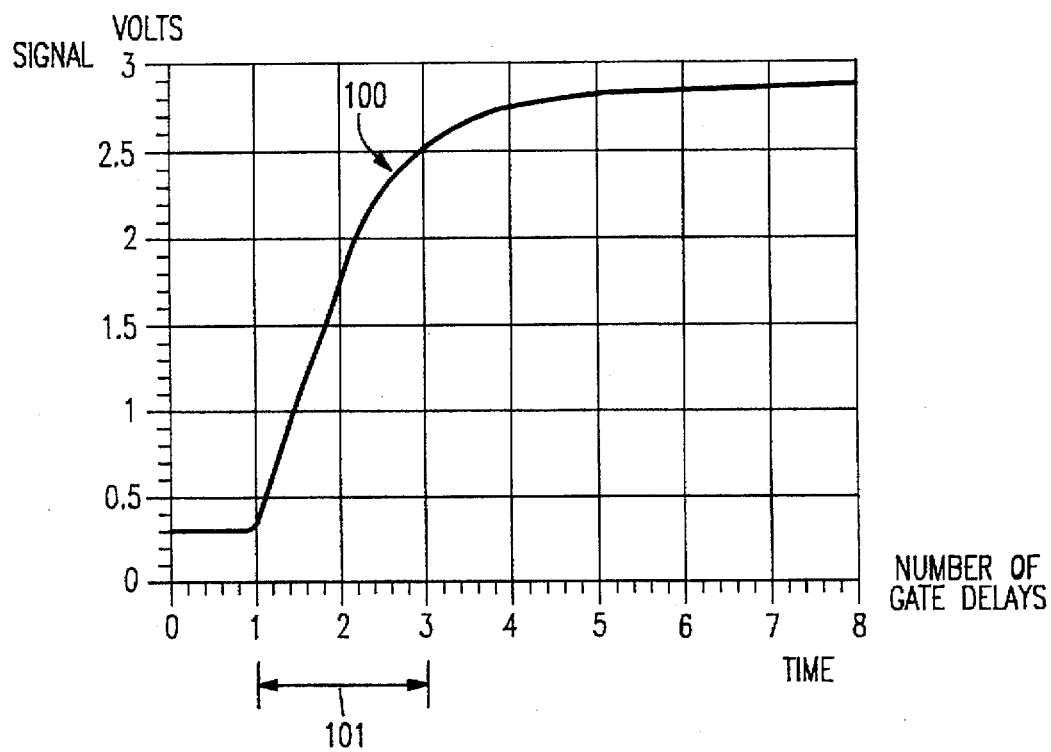
FIG. 1A shows the setup time (in number of gate delays) for a signal to be sensed by a prior art circuit.
Figure 1B:
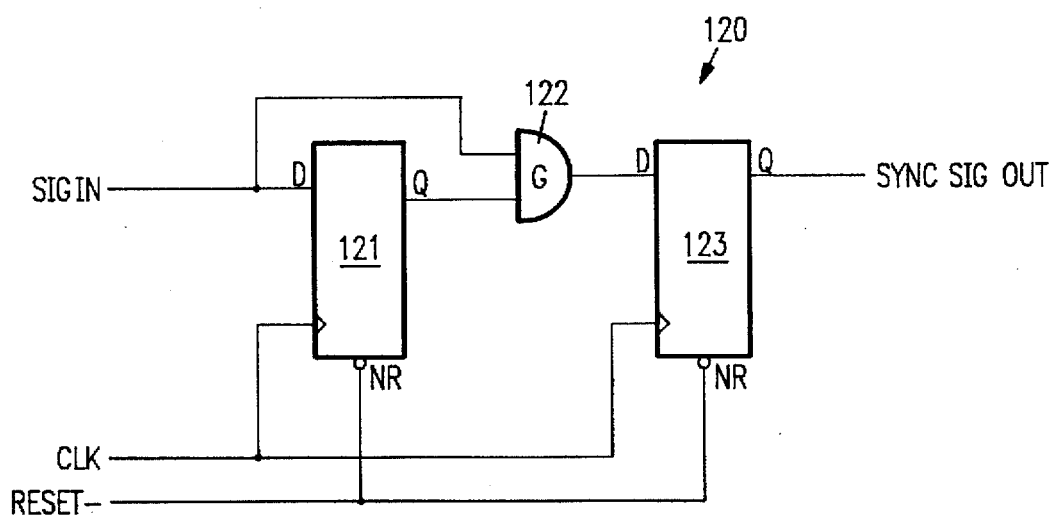
FIG. 1B illustrates a prior art synchronization circuit.
Figure 2A:
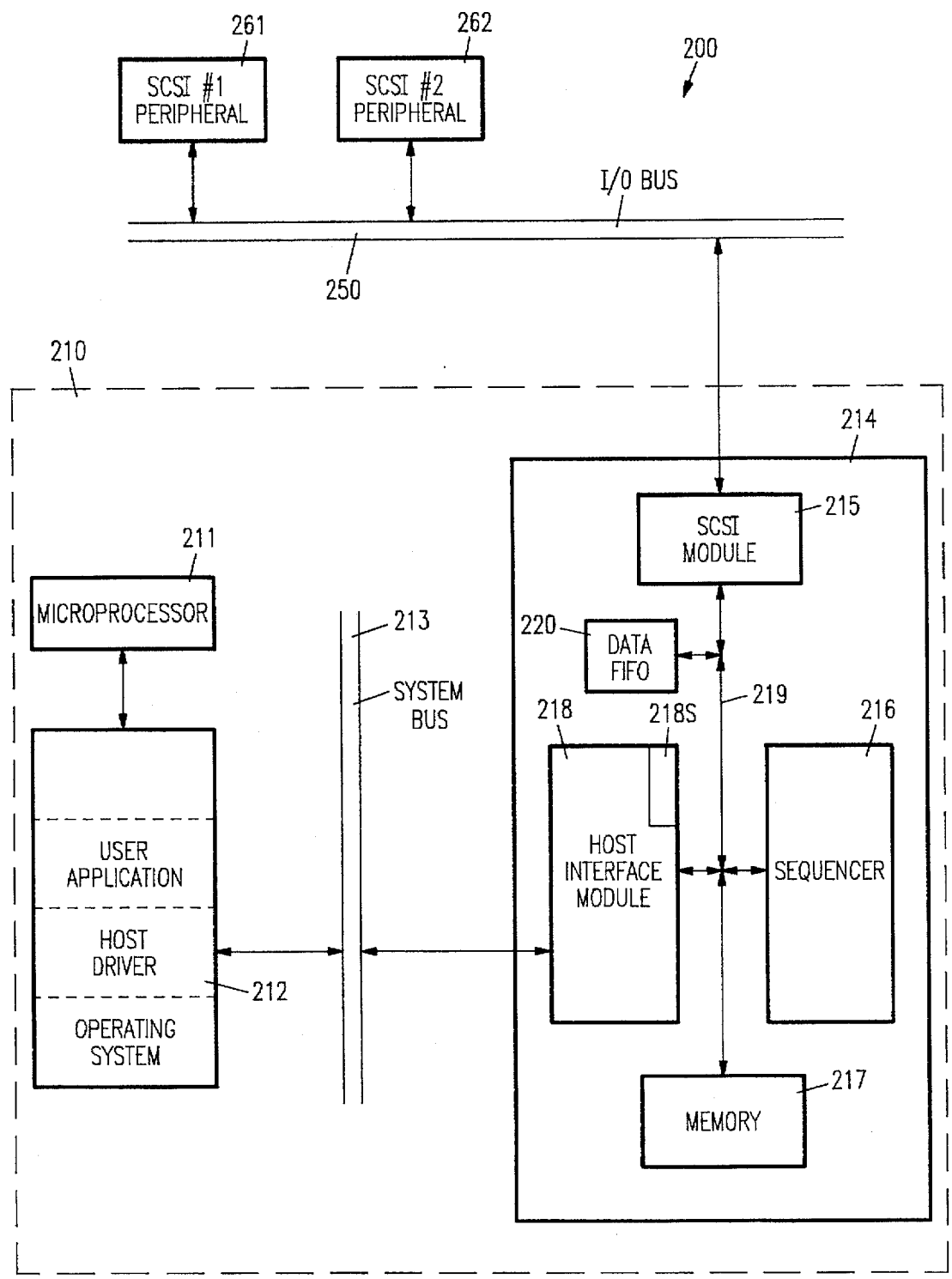
FIG. 2A shows a prior art computer system including a host adapter card operatively coupled between a SCSI bus and a host bus.
Figure 2B:
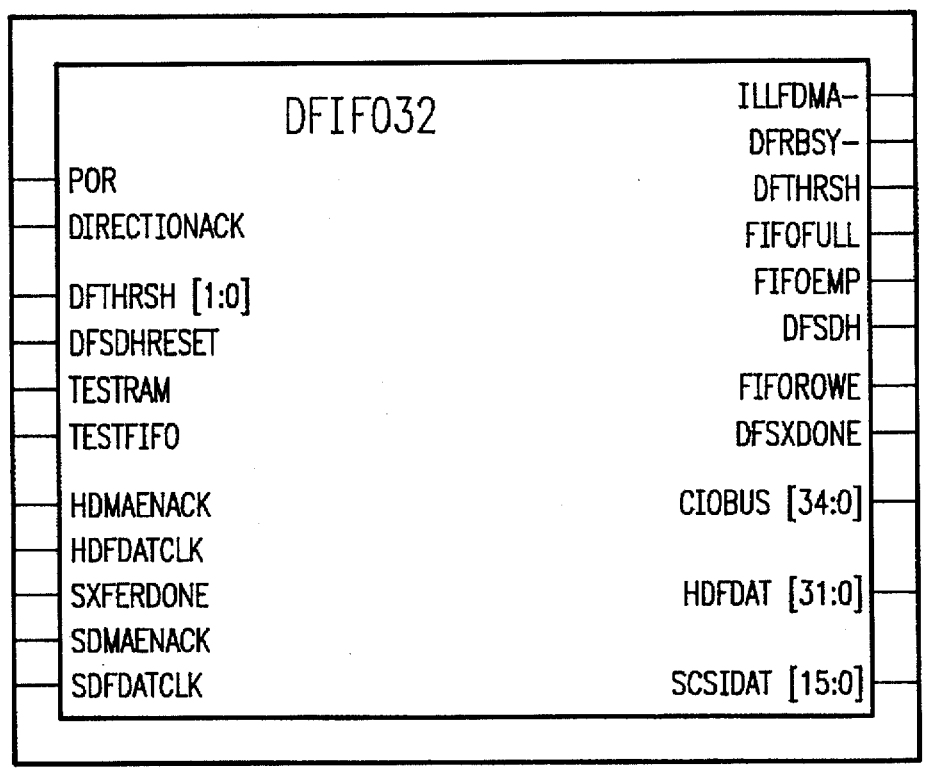
FIG. 2B illustrates a signal interface for the data FIFO queue of FIG. 2A.
Figure 3A:
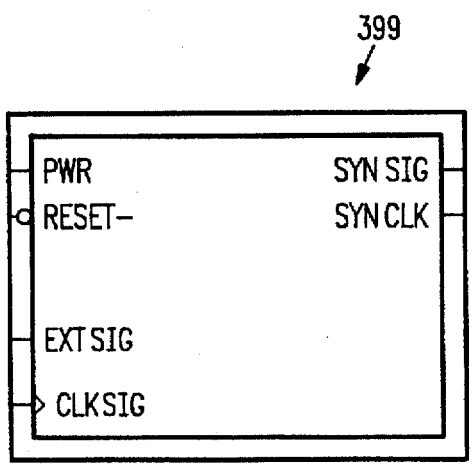
FIG. 3A illustrates a signal interface for one embodiment of a synchronization circuit in accordance with this invention.
Figure 3B:
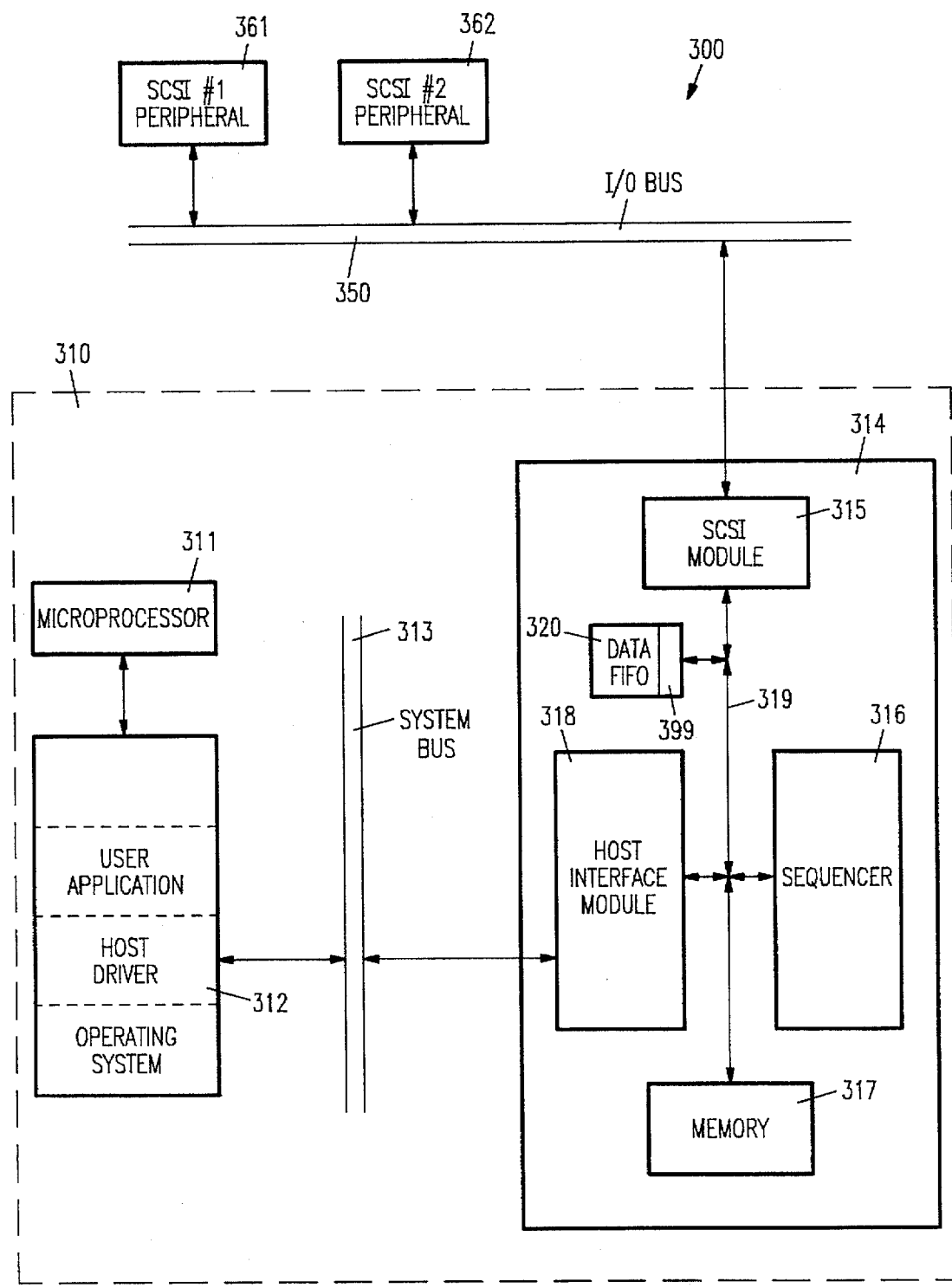
FIG. 3B illustrates a computer system including the synchronization circuit of this invention.

FIG. 3A illustrates a signal interface for one embodiment of a synchronization circuit 399 according to the principles of this invention. Synchronization circuit 399 is used by a data FIFO memory queue 320, in one embodiment of a host adapter integrated circuit 314, shown in FIG. 3B. Like reference numerals are used in FIG. 3B to refer to elements which are similar, but not necessarily identical to those of FIG. 2A (above), e.g., "100" was added to the reference numerals of computer system 200 of FIG. 2B to obtain most of the reference numerals of computer system 300 in FIG. 3B (except, for example, synchronization circuit 399).

The location of synchronization circuit 399 at the input of data FIFO memory queue 320 allows provision of the synchronized signal directly to data FIFO memory queue 320, without incurring the time delays associated with passing the synchronized signal over bus 319, as was done in the prior art. Moreover, providing a synchronized signal directly to the data FIFO memory queue avoids the problem of synchronizing a clock signal in SCSI Module 315 with a different clock signal in host interface module 318.

Use of synchronization circuit 399 in host adapter integrated circuit 314 is only illustrative of the principles of this invention, and is not intended to limit the invention to a host adapter integrated circuit. In view of this disclosure, those skilled in the art can implement the invention in other computer systems with different host and system bus architectures.

Synchronization circuit 399 (FIG. 3A) has four input signals and two output signals. External input signal EXTSIG, hereinafter simply signal EXTSIG, is the signal to be synchronized. Signal EXTSIG, in this embodiment, is the clock signal from system bus 313, for example a PCI bus. Clock signal CLKSIG (FIG. 3A), hereinafter signal CLKSIG, is the signal that is used to perform synchronization. Signal CLKSIG, in this embodiment, is clock signal HCLKH of frequency 40 MHz of host adapter integrated circuit 314. In one embodiment, host adapter integrated circuit 314 generates its own clock signal HCLKH from an external oscillator. Input signal PWR (FIG. 3A) is a power supply voltage signal to synchronization circuit 399. Input signal RESET-, hereinafter signal RESET-, is a power on reset signal which when active causes various components of synchronization circuit 399 to be reset, e.g., to be initialized, overriding fabrication variation conditions internal to circuit 399 and activity of input signals CLKSIG and EXTSIG, so that output signals SYNSIG and SYNCLK, as described more completely below are in the inactive state.

Synchronized signal SYNSIG, hereinafter signal SYNSIG, is an output signal having a leading edge derived from a leading edge of signal EXTSIG. Synchronized clock SYNCLK, hereinafter signal SYNCLK, is an output signal having a leading edge derived from a first triggering edge, hereinafter first edge, e.g., a falling edge, of signal CLKSIG and a trailing edge derived from a second edge, e.g., a rising edge of signal CLKSIG. Signal SYNSIG also has a trailing edge derived from the second edge of signal CLKSIG.

Synchronization circuit 399 passes a leading edge in signal EXTSIG as the leading edge in signal SYNSIG, after a delay time necessary for signal EXTSIG to pass through synchronization circuit 399. Thereafter, for a predetermined time period, synchronization circuit 399 is insensitive to signals EXTSIG and CLKSIG. The duration of the predetermined time period for signal CLKSIG is chosen to avoid the metastable problem and must be greater than the internal setup time for the leading edge in signal EXTSIG.

Immediately after passage of the predetermined time period, synchronization circuit 399 becomes sensitive to the first edge, e.g., a falling edge, in signal CLKSIG, which is then passed as a leading edge, e.g., a falling edge, in signal SYNCLK. Thereafter, synchronization circuit 399 becomes sensitive to the second edge, e.g., a rising edge, in signal CLKSIG, which is then passed as the trailing edge in both signals, i.e., signal SYNSIG and signal SYNCLK. Thereafter circuit 399 reinitializes itself to complete the current synchronization cycle, before circuit 399, again becomes sensitive to signal EXTSIG. The relationship between these four input and two output signals of synchronization circuit 399 is better understood in view of the implementation details of synchronization circuit 399, that are described below.

Figure 4:
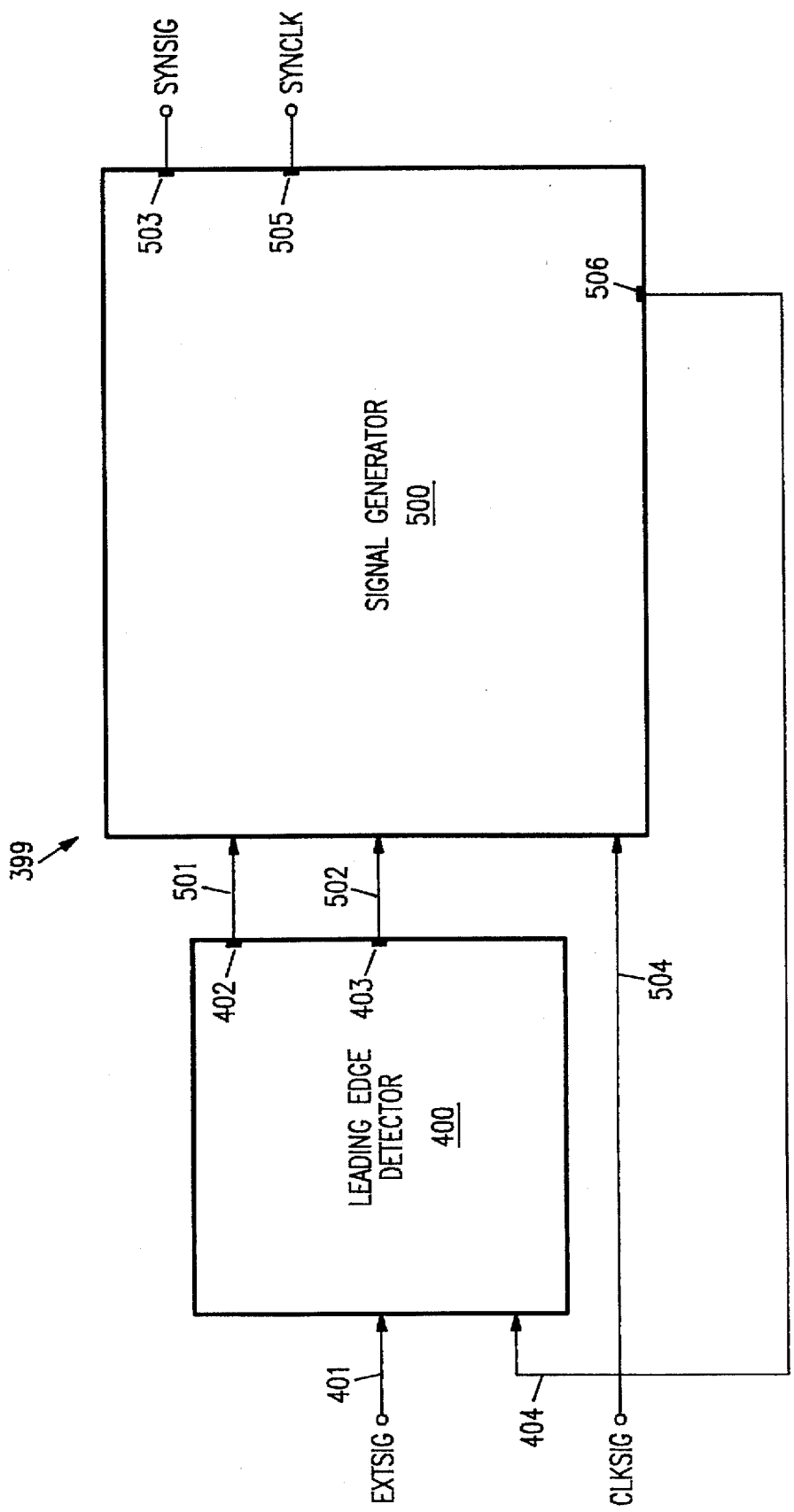
FIG. 4 shows a high level block diagram of one embodiment of a synchronization circuit of FIG. 3A.

FIG. 4 illustrates a high level block diagram of one embodiment of a synchronization circuit 399 in accordance with this invention. Synchronization circuit 399 includes a leading edge detector 400 and a signal generator 500. Signals PWR and RESET- discussed above in reference to FIG. 3A are not shown in FIG. 4 for clarity.

Leading edge detector 400 has a signal input line 401, a reset input line 404, an output terminal 402 and a delayed output terminal 403. Signal EXTSIG, for example from a system bus, such as system bus 313 (FIG. 3B), drives signal input line 401. In response to a transition in signal EXTSIG, leading edge detector 400 drives a signal active on output terminal 402. Signal EXTSIG is passed through leading edge detector 400 and so the signal on output terminal 402 is the leading edge in signal EXTSIG delayed by the time period necessary for leading edge detector 400 to change state from inactive to active.

Leading edge detector 400 also drives a signal active on delayed output terminal 403 at the end of the predetermined time period measured from the time the signal on output terminal 402 goes active. The active signal on delayed output terminal 403 enables signal generator 500 to respond to signal EXTSIG on first input line 501.

Signal generator 500 has a first input line 501 and an enable input line 502 connected respectively to output terminal 402 and delayed output terminal 403 of leading edge detector 400. In addition to first input line 501 and enable input line 502, signal generator 500 also has a second input line 504, a reset output terminal 506, a synchronized signal output terminal 503 and a synchronized clock output terminal 505. Signal generator 500 passes the signal on first input line 501 directly as signal SYNSIG on synchronized signal output terminal 503, without any synchronizing delay. Therefore the leading edge in signal EXTSIG passes through leading edge detector 400 and signal generator 500 after being delayed by the time period required for leading edge detector 400 to change state.

When the signal on enable input line. 502 goes active, signal generator 500 becomes responsive to a first edge, e.g., a falling edge, in signal CLKSIG on second input line 504. In response to the first edge, signal generator 500 generates a leading edge in the signal on synchronized clock output terminal 505, only when the signal enable input line 502 is active.

After generation of the leading edge, signal generator 500 becomes responsive to a second edge, e.g., a rising edge, in signal CLKSIG on second input line 504. In response to the second edge, signal generator 500 generates a trailing edge on both the synchronized signal output terminal 503 and synchronized clock output terminal 505 simultaneously. At the same time, signal generator 500 also drives a signal on reset output terminal 506, connected to reset input line 404 of leading edge detector 400, active.

When the signal on reset input line 404 goes active, leading edge detector 400 sequentially resets its internal components in a predefined order and so drives the signals on output terminal 402 and delayed output terminal 403 inactive. When the signal on enable input line 502 goes inactive, signal generator 500 becomes insensitive to the signals on second input line 504, until the signal on enable input line 502 is again active.

Being insensitive to the signals on second input line 504 during the predetermined time period, signalled by leading edge detector 400, allows precharging of the signal on first input line 501 of signal generator 500 before signal generator 500 becomes sensitive to signals on second input line 504. Therefore, leading edge detector 400 prevents any metastability and results in a leading edge in the signal synchronized clock output terminal 505 only after the passage of the predetermined time period. Thereafter, synchronization circuit 399 provides signals SYNSIG and SYNCLK both having a synchronized trailing edge to a receiver circuit, such as data FIFO memory queue 320 described above in reference to FIG. 3.

Figure 5:
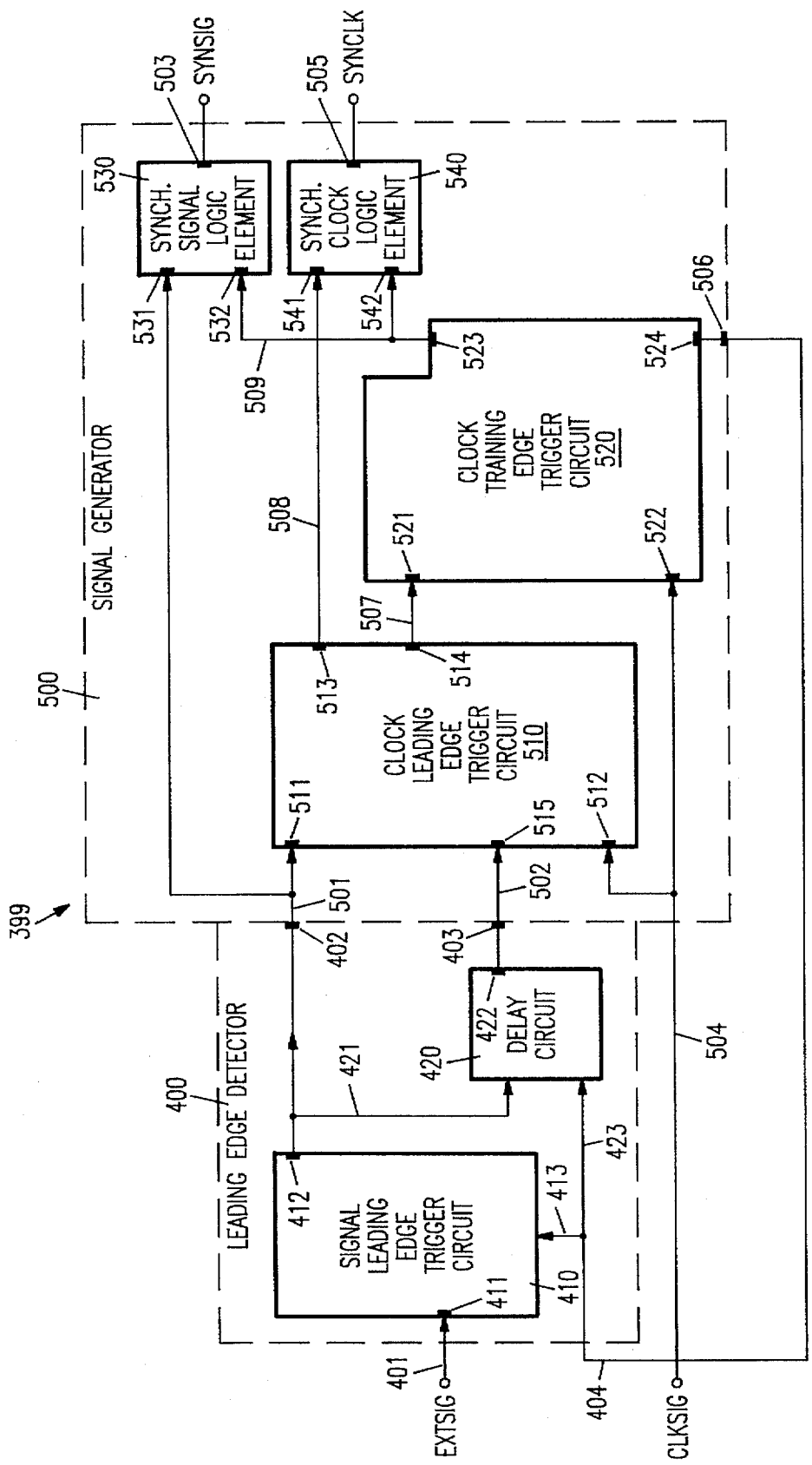
FIG. 5 shows a low level block diagram of one embodiment of a synchronization circuit of FIG. 4.

FIG. 5 illustrates a block diagram of synchronization circuit 399 of FIG. 4 showing the details of leading edge detector 400 and signal generator 500. Leading edge detector 400 includes a signal leading edge trigger circuit 410 and a delay circuit 420. Signal leading edge trigger circuit 410 has an input terminal 411 and an output terminal 412. In response to a leading edge in signal EXTSIG on input terminal 411 connected to signal input line 401, signal leading edge trigger circuit 410 drives the signal on output terminal 412 that is connected to the leading edge detector output terminal 402 active.

Delay circuit 420 has an input line 421 and an output terminal 422. In response to an active signal on input line 421, that is connected to output terminal 412 of signal leading edge trigger circuit 410, delay circuit 420 waits for a predetermined period of time and then generates an active signal on output terminal 422, that is connected to delayed output terminal 403 of leading edge detector 400.

Signal leading edge trigger circuit 410 and delay circuit 420 have reset input lines 413 and 423, respectively, which are both connected to reset input line 404 of leading edge detector 400. An active signal on reset input lines 413 and 423 causes signal leading edge trigger circuit 410 and delay circuit 420 to drive the signals on output terminals 412 and 422 respectively inactive. Hence, after being reset, e.g., when the signal on reset input line 404 goes inactive, leading edge detector 400 can respond to another leading edge in signal EXTSIG on signal input line 401.

Signal generator 500 (FIG. 5) includes clock leading edge trigger circuit 510, clock trailing edge trigger circuit 520, synchronized signal logic element 530 and synchronized clock logic element 540.

Clock leading edge trigger circuit 510 has a first input terminal 511, a second input terminal 512 and an enable input terminal 515 which are respectively connected to first input line 501, second input line 504 and enable input line 502 of signal generator 500. In addition to these input terminals, clock leading edge trigger circuit 510 also has a first output terminal 513 and a second output terminal 514.

Clock leading edge trigger circuit 500 is initially insensitive to signals on second input terminal 512 until the signal on enable input terminal 515 goes active, at which point clock leading edge trigger circuit 510 becomes sensitive to a first edge, e.g., a falling edge, in the signal on second input terminal 512. When the first edge occurs in the signal on second input terminal 512, clock leading edge trigger circuit 510 drives a signal on first output terminal 513, that is connected to a first input terminal of synchronized clock logic element 540, active and a signal on second output terminal 514, that is connected to a disable input terminal 521 of clock trailing edge trigger circuit 520, inactive.

Clock trailing edge trigger circuit 520 has a clock input terminal 522, a first output terminal 523 and a second output terminal 524 in addition to disable input terminal 521. Clock trailing edge trigger circuit 520 is inactive, i.e., insensitive to signal CLKSIG on its clock input terminal 522, as long as the signal on its disable input terminal 521 is active. When the signal on disable input terminal 521 becomes inactive, clock trailing edge trigger circuit 520 becomes sensitive to a second edge, e.g., rising edge, in signal CLKSIG on clock input terminal 522. Thereafter, when the second edge occurs in the signal on clock input terminal 522, clock trailing edge trigger circuit 520 drives the signals on all its output terminals active, i.e., the signal on first output terminal 523 connected to second input terminals 532 and 542 of synchronized signal logic element 530 and synchronized clock logic element 540 active and also the signal on second output terminal 524 connected to reset output terminal 506 of signal generator 500 active.

As noted above, synchronized signal logic element 530 and synchronized clock logic element 540 have respectively first input terminals 531 and 541, second input terminals 532 and 542 and include as output terminals, synchronized signal output terminal 503 and synchronized clock output terminal 505. If the signals on second input terminals 532 and 542 of synchronized signal logic element 530 and synchronized clock logic element 540 are active, the signals on second input terminals 532 and 542 are passed to the synchronized signal output terminal 503 and synchronized clock output terminal 505 respectively, else the signals on first input terminals 531 and 541 are passed to the synchronized signal output terminal 503 and synchronized clock output terminal 505 respectively.

Therefore, signal generator 500 passes a leading edge on first input line 501 as signal SYNSIG on synchronized signal output terminal 503 and after the passage of at least the predetermined time period, the first edge, e.g., the falling edge, on second input line 504 as signal SYNCLK on synchronized clock output terminal 505. Then, signal generator 500 passes the second edge, e.g., rising edge, on second input line 504 as a trailing edge in both signals SYNSIG and SYNCLK on synchronized signal and clock output terminals 503 and 505.

As noted above, clock trailing edge trigger circuit 520 provides the active signal on output terminal 523, as an active signal on reset output terminal 506, which drives the signals on reset input line 404 active, which in turn drives the signal on reset input lines 413 and 423 active. The active signal on reset input lines 413 and 423 in turn asynchronously resets signal leading edge trigger circuit 410 and delay circuit 420 in a predefined order as follows. On being reset, signal leading edge trigger circuit 410 drives a signal on output terminal 412 low that causes the signal on output terminal 402 of leading edge detector 400 to go low and the signal on input line 421 of delay circuit 420 to go low. Therefore, the signal on first input line 501 of signal generator 500 goes low that in turn drives the signal on first input terminal 511 of clock leading edge trigger circuit 510 low, and thereby makes first input terminal 511 responsive to the next cycle of synchronization circuit 399.

Moreover, the signal on first input line 501 drives the signal on first input terminal 531 of synchronized signal logic element 530. The low signal on first input line 501 prevents any false outputs in signal SYNSIG, when clock trailing edge trigger circuit 520 is reset.

When signal on input line 421 of delay circuit 420 goes low, delay circuit 420 is conditioned for the next synchronization cycle after a signal on reset input line 423 goes low and returns high.

On being reset, delay circuit 420 drives the signal on output terminal 422 low which drives the signal on delayed output terminal 403 of leading edge detector 400 low. Therefore the signal on enable input line 502 goes low and thereby causes the signal on enable input terminal 515 of clock leading edge trigger 510 to go low. The low signal on enable input terminal 515 causes clock leading edge trigger circuit 510 to be reset, so that the signals on first output terminal 513 and second output terminal 514 go low. The low signal on first output terminal 513 drives a signal on line 508 that is connected to first input terminal 541 of synchronized clock logic element 540 low. The low signal on first input terminal 541 prevents any false outputs in signal SYNCLK, when clock trailing edge trigger circuit 520 is reset.

When the signal on second output terminal 514 of clock leading edge trigger 510 goes low, the signal on line 507 connected to disable input terminal 521 of clock trailing edge trigger circuit 520 goes low and thereby resets clock trailing edge trigger circuit 520. On being reset, clock trailing edge trigger circuit 520 drives the signals on first output terminal 523 and second output terminal 524 high. The high signal on output terminal 523 drives a signal on line 509 that is connected to second input terminals 532 and 542 of synchronized signal logic element 530 and synchronized clock logic element 540 high. The high signals at second input terminals 532 and 542 condition synchronized signal logic element 530 and synchronized clock logic element 540 to be ready to drive signals SYNSIG and SYNCLK active in the next cycle of synchronization circuit 399. The high signal on output terminal 524 conditions leading edge detector 400 and delay circuit 420 to be responsive to the next cycle of synchronization circuit 399.

Figure 6:
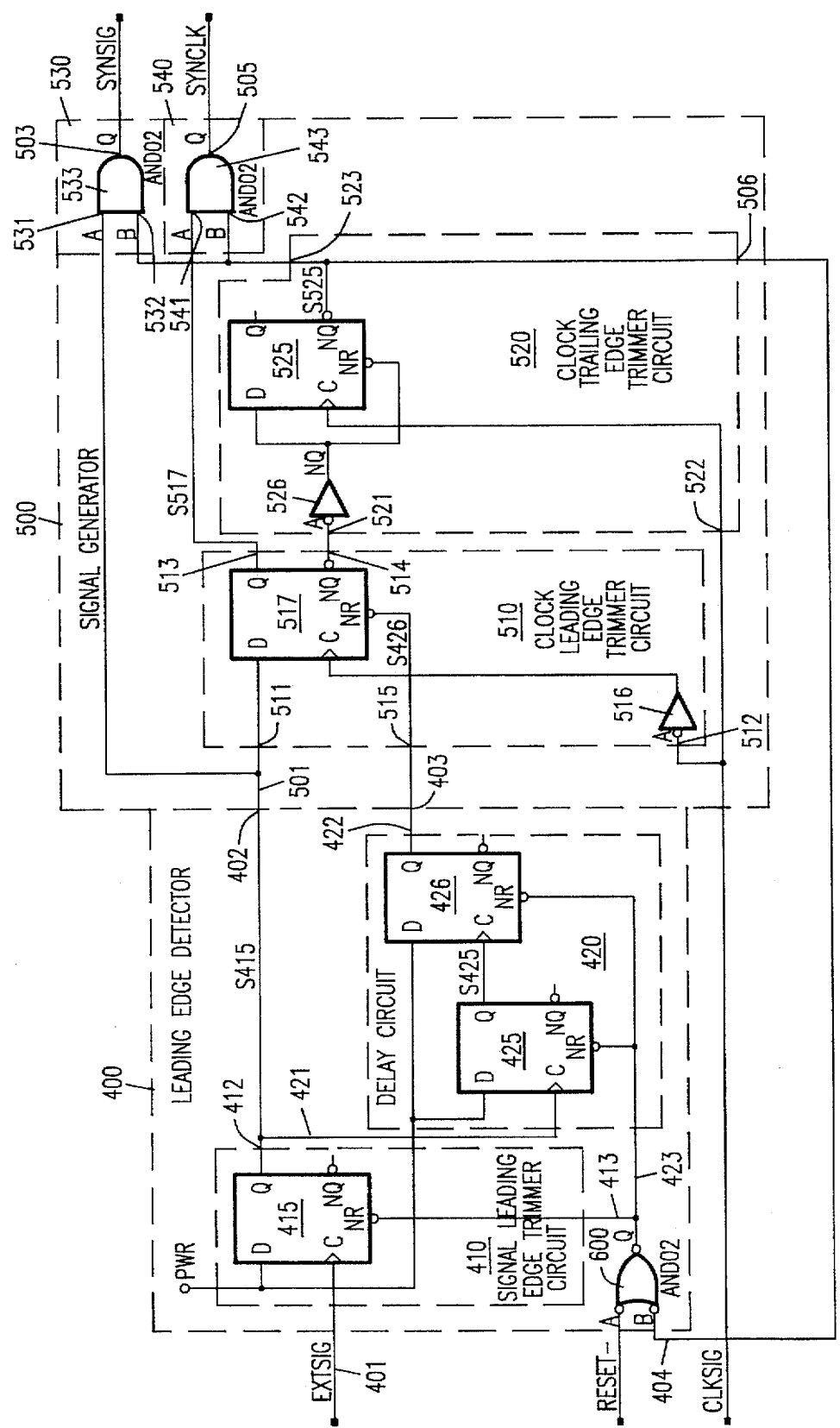
FIG. 6 is an illustrative circuit diagram of one embodiment of the synchronization circuit of FIG. 5.

FIG. 6 is an illustrative circuit diagram of this embodiment of synchronization circuit 399 of FIG. 5. In this embodiment, the first edge in signal EXTSIG is the rising edge, the leading edge in signal CLKSIG is the falling edge for clock leading edge trigger circuit 510 and the second edge in signal CLKSIG is the rising edge for clock trailing edge trigger circuit 520.

Signal leading edge trigger circuit 410 is implemented as a D-type flip-flop 415. Signal EXTSIG on signal input line 401 drives the clock input terminal of flip-flop 415. Flip-flop 415 clocks a power supply signal at input terminal D to output terminal Q that is connected to the signal leading edge trigger circuit output terminal 412, in response to a rising edge in signal EXTSIG.

Delay circuit 420 is implemented in this embodiment by two D-type flip-flops 425 and 426 connected in tandem. Flip-flop 425 has a D input terminal connected to the power supply voltage, a clock input terminal connected to delay circuit input line 421, an active low reset terminal connected to reset input line 423, and an output terminal Q connected to a clock input terminal of flip-flop 426. Flip-flop 426 has an input terminal D connected to the power supply voltage, an active low reset terminal connected to reset input line 423, and an output terminal Q that is the delay circuit output terminal 422.

Therefore, in response to a rising edge at output terminal Q of flip-flop 415, flip-flops 425 and 426 clock the power supply signal to delay circuit output terminal 422 after two flip-flop delays (i.e., four gate delays).

Clock leading edge trigger circuit 510 is implemented by a D-type flip-flop 517 and an inverter 516. The leading edge from signal EXTSIG on first input terminal 511 drives input terminal D of flip-flop 517, while flip-flop 517 is held in reset by the inactive (e.g. low) signal on enable input terminal 515 connected to the reset input terminal of flip-flop 517 for two flip-flop delays, i.e., until after the signal setup time for flip-flop 517 is satisfied. Second input terminal 512 of clock leading edge trigger circuit 510 is connected through inverter 516 to the clock input terminal of flip-flop 517.

After the predetermined time period, once the signal on enable input terminal 513 goes active (e.g. high) the next rising edge at the clock input terminal of flip-flop 517, i.e., a falling edge in signal CLKSIG, on second input terminal 512 causes flip-flop 517 to clock the leading edge in signal EXTSIG without any metastability. Therefore a metastable problem in flip-flop 517 is avoided in one embodiment of this invention by using the reset function of flip-flop 517 for the predetermined time period to keep flip-flop 517 in reset until the setup time, i.e. the precharging time of flip-flop 517 is satisfied. Output terminal Q and output terminal NQ of flip-flop 517 act as the first output terminal 513 and second output terminal 514 respectively of clock leading edge trigger circuit 510.

Clock trailing edge trigger circuit 520 is implemented by a D-type flip-flop 525 and an inverter 526. A signal on disable input terminal 521 of clock trailing edge trigger circuit 520 passes through inverter 526 and drives both input terminal D as well as reset input terminal NR of flip-flop 525. The signal at the clock input terminal 522 of clock trailing edge trigger circuit 520 drives the clock input terminal C of flip-flop 525. Flip-flop 525 is reset as soon as the signal applied to reset input terminal NR goes low. When the signal on reset input terminal NR goes high, flip-flop 525 is no longer in reset and the signal on input terminal D is conditioned to respond to the current cycle of synchronization circuit 399. Thus, the next rising edge at the clock input terminal C, e.g., the second edge in signal CLKSIG causes flip-flop 525 to clock the signal at input terminal D to generate the trailing edge in the signal on output terminal NQ of flip-flop 525. The signal on output terminal NQ of flip-flop 525 appears in a signal on output terminal 523 of clock trailing edge trigger circuit 520 and on reset output terminal 506 of signal generator 500. Synchronized signal logic element 530 and synchronized clock logic element 540 are each implemented by AND gates 533 and 543 to which second input terminals 532 and 542 are connected. When the signal on output terminal 523 is low, AND gates 533 and 543 prevent signals SYNSIG and SYNCLK from going high.

An active signal on reset output terminal 506 causes flip-flops 415, 425 and 426 to be asynchronously reset, which in turn causes flip-flop 517 and subsequently flip-flop 525 also to be reset. Such an asynchronous reset allows synchronization circuit 399 to be responsive to the next leading edge in signal EXTSIG within ten gate delays (e.g. 4 nanoseconds for 0.5 micron CMOS gates) of the trailing edges in signals SYNSIG and SYNCLK, thus avoiding the missed access problem. Hence all flip-flops in FIG. 6 have asynchronous resets for fast recovery action that is necessary to avoid the missed access problem. In the embodiment shown in FIG. 6, an AND gate 600 is used to combine a system-wide power on reset signal RESET- with the signal on reset input line 404 from reset output terminal 506 to generate the signals on lines 423 and 413.

Figure 7A:
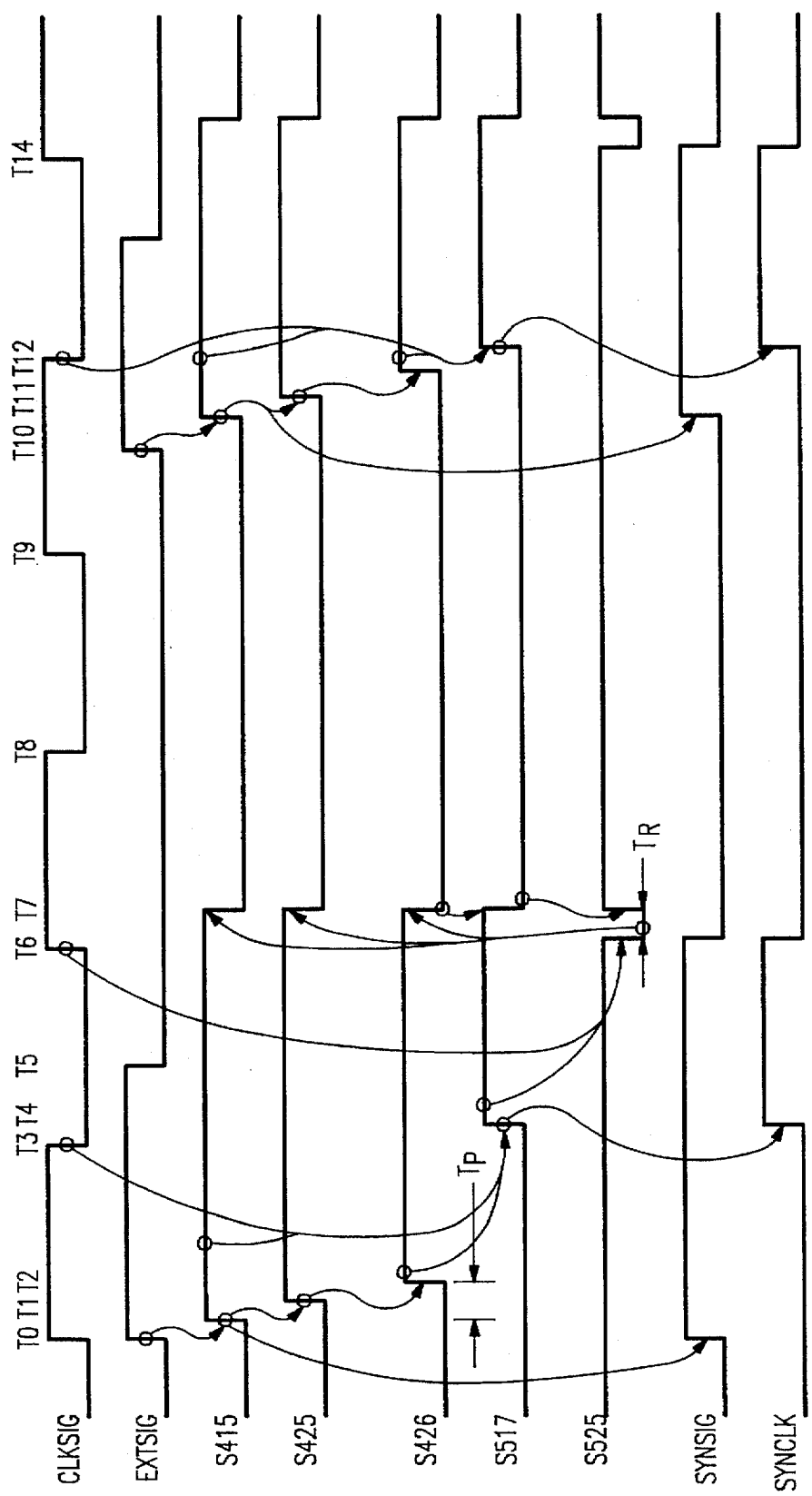
FIG. 7A is an illustrative conceptual timing diagram for the various signals in one embodiment of a synchronization circuit in accordance with this invention.

FIG. 7A is a timing diagram for the synchronization circuit signal timing in normal cycles. Note that features are expanded in FIG. 7A to illustrate a particular sequence. The following discussion of the various signals involved gives the relationship as if the complete time scale was illustrated.

In FIG. 7A, signal CLKSIG has a frequency of 40 MHz and signal EXTSIG has a frequency of 16.7 MHz. Signal EXTSIG is derived from clock signal HDFDATCLK of frequency 33.3 MHz by pulsing at every other clock cycle. Although the frequency of signal HDFDATCLK is halved in signal EXTSIG, the data rate is maintained at the frequency of host bus 313 because data FIFO memory queue 320 has a width that is double the width of host bus 313. Host interface module 318 buffers a first word received from host bus 313 while a second word is being received. Thereafter, during the next cycle in signal EXTSIG, while host interface module 318 receives the next two words, bus structure 319 transfers the first word and the second word which were buffered to data FIFO memory queue 320.

In one specific embodiment, host bus 313 is 4 bytes wide, data FIFO memory queue 320 is 8 bytes wide and host interface module 318 has two 32 bit storage elements that buffer the data from host bus 313. So while data in a first storage element is being transferred to data FIFO memory queue 320, host interface module 318 receives data from host bus 313 in the second storage element.

Signal EXTSIG (FIG. A) has a frequency of 33.3 MHz, i.e., 30 nanoseconds between any two rising edges. Signal CLKSIG has a frequency of 40 MHz, i.e., 25 nanoseconds between any two rising edges. In FIG. A, the leading edge in signal EXTSIG is a rising edge which occurs simultaneously with a rising edge in signal CLKSIG at time T0. The rising edge in signal EXTSIG drives a signal S415 on output terminal Q of flip-flop 415 high at time T1. The rising edge in signal S415 in turn drives signal S425 at output terminal Q of flip-flops 425 high, after one flip-flop delay. Signal S415 is also passed as signal SYNSIG by AND gate 533 to synchronized signal output terminal 503. Signal S425 going high in turn drives signal S426 at output terminal Q of flip-flop 426 high after one flip-flop delay, at time T2. Therefore, the total time delay between signal S415 on output terminal 402 going high and signal S426 on delayed output terminal 422 going high is TP=T2−T1=2 flip-flop delays, e.g., 4 gate delays, assuming 2 gate delays per flip-flop.

Once signal S426 goes high, flip-flop 517, after a reset to clock the recovery delay, becomes sensitive to a rising edge at its clock input terminal. The falling edge in signal CLKSIG, i.e., the first edge at time T3 causes flip-flop 517 to generate a rising edge in signal S517 at its Q output at time T4. Simultaneously, at time T4, flip-flop 517 drives the signal at output terminal NQ low, which is inverted by inverter 526 and supplied as a high signal to input terminal D and the reset input terminal of flip-flop 525. From this point, flip-flop 525 becomes sensitive to a rising edge in signal CLKSIG, i.e., a second edge.

A falling edge occurs in signal EXTSIG at time T5 and has no effect on synchronization circuit 399.

A rising edge occurs in signal CLKSIG at time T6, which causes flip-flop 525 to drive a signal S525 on output terminal NQ low, which in turn causes AND gates 533 and 543 to pull signals SYNSIG and SYNCLK low thus providing a synchronized trailing edge simultaneously in both signals SYNSIG and SYNCLK.

A low signal at the NQ output terminal of flip-flop 525 also results in an active (e.g. low) signal on reset output terminal 506 which in turn resets flip-flops 415, 425 and 426 at time T7 thus driving signals S415, S425 and S426 low. Reset of flip-flop 426 pulls output terminal Q of flip-flop 426 low which in turn resets flip-flop 517 thus driving signal S517 low. On being reset, flip-flop 517 also drives output terminal NQ high which in turn causes flip-flop 525 to be reset, driving signal S525 high. Signal S525 being high drives signal on line 423 high, and thus removes the reset on flip-flops 415, 425 and 426 and completes the recovery action. Therefore, in this embodiment synchronization circuit 399 can respond to rising edge in signal EXTSIG after nine gate delays after time T7. The behavior of synchronization circuit 399 after time T8 is similar to that discussed above for times T0 to T7, except for differences in response time of synchronization circuit 399, as noted below.

Figure 7B:
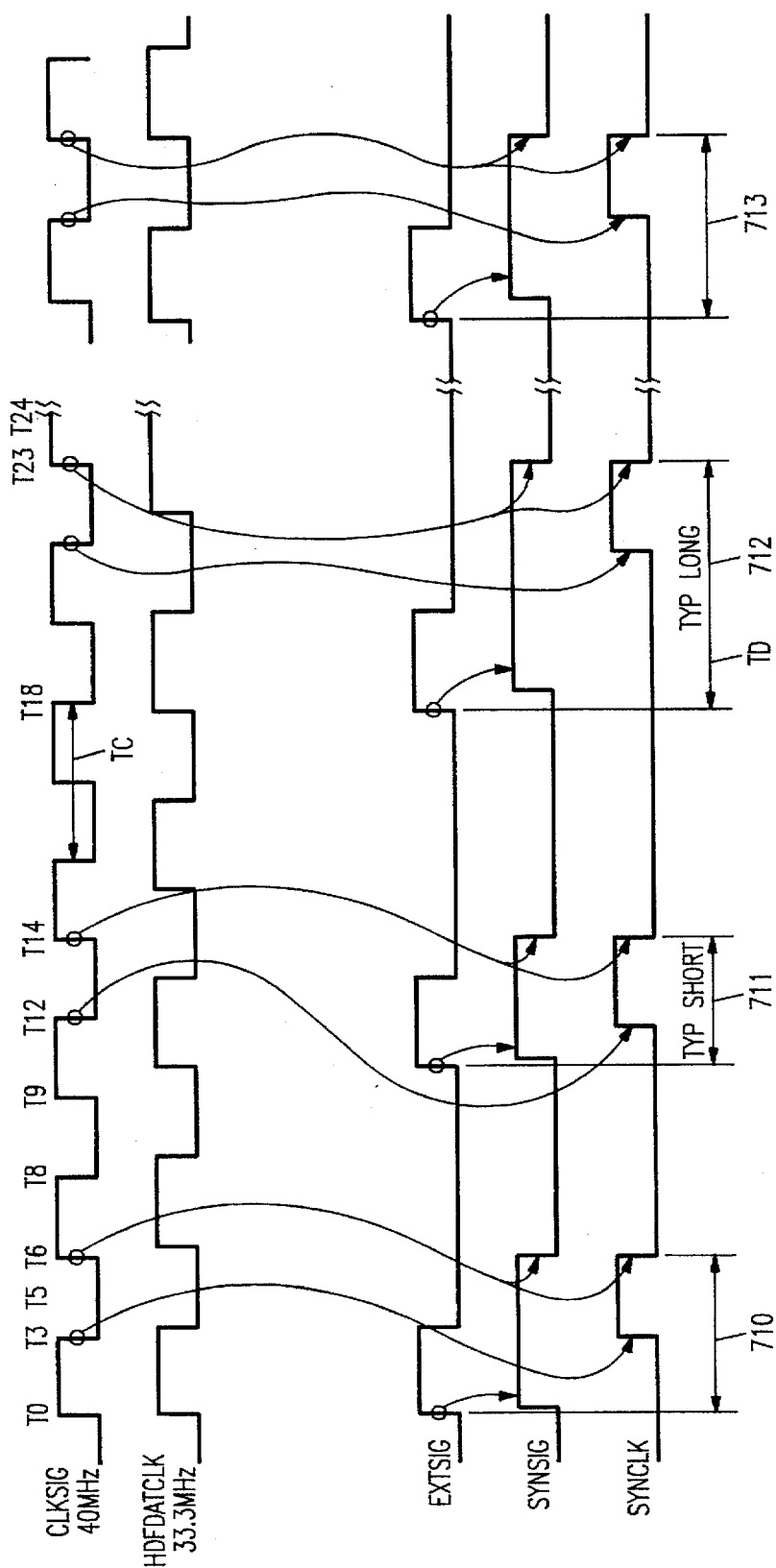
FIG. 7B is an illustrative conceptual timing diagram for the various signals in one embodiment of a synchronization circuit in accordance with this invention showing a longer time scale than shown in FIG. 7A.

Synchronization circuit 399 is insensitive to a falling edge in signal CLKSIG during the predetermined time period as measured from time T0 up to time T2, until signal S426 goes high, which occurs only at time T2. In this embodiment, a random-access-memory driven by signal SYNSIG is charged during the time that signal SYNSIG remains high, i.e. in response time 710 (FIG. 7B) of synchronization circuit 399.

If the falling edge in signal CLKSIG at time T12 occurs immediately after signal S426 goes high then synchronization circuit 399 drives signal SYNCLK high and at the next rising edge in signal CLKSIG at time T14 drives both signals SYNCLK and SYNSIG low. The minimum response time 711 is, in this embodiment, no smaller than 12.5 nanoseconds (half the period of signal CLKSIG). Therefore, synchronization circuit 399 supplies a rising edge in SYNCLK after passage of at least the predetermined time period TP after a rising edge in SYNSIG.

The minimum response time 712 is the response time when the falling edge in signal CLKSIG occurs before signal S426 goes high. During response time 712, synchronization circuit 399 waits for one and one half cycles in signal CLKSIG in addition to the predetermined time period, from time T18 until time T23, at which time synchronization circuit 399 drives signals SYNCLK and SYNSIG low. All other response times, such as response time 713, are between maximum response time 712 and minimum response time 711.

Therefore, the maximum delay between a rising edge in signal SYNSIG and a rising edge in signal SYNCLK, imposed by synchronization circuit 399, is the maximum response time, i.e. TD=1.5 TC+TP, wherein TC is the time period of signal CLKSIG (e.g. 25 nanoseconds at 40 MHz) and TP is the predetermined time period (e.g. 2 nanoseconds for 0.5 micron CMOS gates).

In this embodiment, a feed-back signal must be returned within two clock cycles less setup time required by host interface module 318 to signal communication status on host bus 313. Therefore, the feedback signal must be returned in 60−8.5=51.5 nanoseconds. Synchronization circuit 399 supplies the feedback signal after at most 43.5 nanoseconds of each access in this embodiment, which is well below the 51.5 nanoseconds requirement imposed by host interface module 318.

The minimum time period of signal EXTSIG is TD+TR, wherein TR is the reset time period, e.g., 5 nanoseconds for 0.5 micron CMOS gates. In this embodiment, the minimum time period of signal EXTSIG is 1.5 TC+TP+TR=37.5+5+1=43.5 nanoseconds and so a feed-back signal can be easily returned with 16.5 nanoseconds left, that is almost twice the 8.5 nanoseconds needed by host interface module 318. Also, as the period of signal EXTSIG is 60 nanoseconds which is greater than the maximum period of 43.5 nanoseconds needed by synchronization circuit 399, the missed access problem is avoided.

Although in the embodiment described above, the synchronization circuit 399 has been implemented for a data FIFO queue (FIG. 3B), any other component of host adapter integrated circuit 314 can be driven by the synchronized signal SYNSIG and the synchronized clock SYNCLK in accordance with this invention.

Moreover, although in this embodiment, synchronization circuit 399 is implemented in 0.8 micron double metal CMOS process, in another embodiment, synchronization circuit 399 can be implemented in 0.6 micron double metal CMOS process or other processes of similar or faster technology.

Moreover, although signal CLKSIG clocks at 40 MHz in this embodiment, a slower frequency can be used in accordance with this invention. For example, TC can go to 30 nanoseconds, i.e. same frequency as signal HDFDATCLK, and yet have TD=51 nanoseconds that is less than 51.5 nanosecond requirement imposed by the host interface module.

Although the present invention has been described in connection with the above-described illustrative embodiment, the present invention is not limited thereto. For example, instead of connecting the D input terminal D of flip-flop 517 to first input line 501, input terminal D of flip-flop 517 can be connected to the power supply voltage. Also, instead of the leading edge being a rising edge in signal EXTSIG and the first edge being a falling edge in signal CLKSIG, any other combination, such as falling edge in signal EXTSIG and falling edge in signal CLKSIG can be used. Furthermore, a delay circuit can be implemented via buffers instead of flip-flops. Also, instead of the predetermined time period being two flip-flop delays, any amount of delay can be implemented by a delay circuit that uses the flip-flop reset function to avoid a metastable problem in accordance with this invention. Also the SCSI protocol can be run on a fiber channel interface such as the one described in "Fibre Channel-Physical And Signaling Interface (FC-PH)" that is incorporated by reference herein in its entirety and that is available from Global Engineering, 15 Inverness Way East, Englewood, Colo. 80112-5704. Moreover, instead of SCSI interface, a different interface can be used for an input/output bus in accordance with this invention. Also, the synchronization circuit can be used with the host adapter integrated circuit clock as signal EXTSIG and the bus clock as signal CLKSIG. Various modifications and adaptations of the above-discussed embodiment are encompassed by this invention as set forth in the appended claims.

What is claimed is:

1. A synchronization circuit comprising:

a leading edge detector having a signal input line, a reset input line, a first output terminal and a second output terminal;

wherein said leading edge detector drives a signal on said first output terminal active in response to a leading edge on said signal input line; and said leading edge detector drives a signal on said second output terminal active after passage of a predetermined time period measured from the time said first output terminal signal is driven active; and a signal generator having:

a first input line coupled to said leading edge detector first output terminal;

a second input line;

an enable input line coupled to said leading edge detector second output terminal;

a synchronized signal output terminal; and a synchronized clock output terminal;

wherein said signal generator drives a leading edge on said signal generator synchronized clock output terminal in response to a leading edge on said signal generator second input line, if said signal generator enable input line has an active signal; and said signal generator provides a trailing edge on said synchronized signal output terminal and simultaneously on said synchronized clock output terminal in response to a trailing edge on said signal generator second input line after said signal generator drives said leading edge on said synchronized clock output terminal.

2. The synchronization circuit of claim 1 wherein said predetermined period is at least equal to a setup time of said signal generator.

3. The synchronization circuit of claim 1 wherein said signal generator further comprises a reset output terminal connected to a reset input line of said leading edge detector; and further wherein said signal generator drives an active signal on said reset output terminal synchronously with said trailing edge on said synchronized clock output terminal; and further wherein said leading edge detector provides an inactive signal asynchronously on said leading edge detector output terminal and on said leading edge detector delayed output terminal on receipt of said active signal on said reset input line.

4. The synchronization circuit of claim 1 wherein said leading edge detector comprises a signal leading edge trigger circuit and a delay circuit; and wherein said signal leading edge trigger circuit comprises an output terminal coupled to said leading edge detector output terminal, and an input terminal coupled to said leading edge detector signal input line; and further wherein said signal leading edge trigger circuit drives a first signal on said leading edge detector output terminal active in response to a leading edge in a signal on said leading edge detector signal input line; and wherein said delay circuit comprises an output terminal coupled to said leading edge detector delayed output terminal and an input line coupled to said signal leading edge trigger circuit output terminal; and further wherein said delay circuit drives a second signal on said leading edge detector delayed output terminal active after passage of said predetermined time period as measured from the time said first signal is driven active by said signal leading edge trigger circuit.

5. The synchronization circuit of claim 4 wherein said signal leading edge trigger circuit comprises a flip-flop, a clock input terminal of said flip-flop being the input terminal of said signal leading edge trigger circuit and an output terminal of said flip-flop being said signal leading edge trigger circuit output terminal.

6. The synchronization circuit of claim 4 wherein said delay circuit comprises a first flip-flop, a clock input terminal of said first flip-flop being coupled to said signal leading edge trigger circuit output terminal.

7. The synchronization circuit of claim 6 further comprising a second flip-flop, a clock input terminal of said second flip-flop being coupled to an output terminal of said first flip-flop, an output terminal of said second flip-flop being said leading edge detector delayed output terminal.

8. The synchronization circuit of claim 1 wherein said signal generator comprises a synchronized signal logic element, an input terminal of said synchronized signal logic element being coupled to said signal generator first input line, said synchronized signal logic element comprising said synchronized signal output terminal of said signal generator.

9. The synchronization circuit of claim 1 wherein said signal generator comprises a clock leading edge trigger circuit, said clock leading edge trigger circuit comprising:

a first input terminal coupled to said signal generator first input line;

a second input terminal coupled to said signal generator second input line;

a third input terminal coupled to said signal generator enable input line; and a first output terminal coupled to said synchronized clock output terminal;

wherein said clock leading edge trigger circuit simultaneously drives a signal on said first output terminal active, and a signal on said second output terminal active in response to a leading edge on said signal generator second input line, if said clock leading edge trigger circuit third input terminal has an active signal.

10. The synchronization circuit of claim 9 wherein said signal generator comprises a clock trailing edge trigger circuit, said clock trailing edge trigger circuit comprising:

a reset output terminal coupled to said signal generator reset output terminal;

a first input terminal coupled to said clock leading edge trigger circuit second output terminal;

a second input terminal coupled to said signal generator second input line; and an output terminal coupled to said synchronized clock output terminal;

wherein said clock trailing edge trigger circuit provides an active signal on said clock trailing edge trigger circuit output terminal in response to a trailing edge on said clock trailing edge trigger circuit second input terminal if said clock trailing edge trigger circuit first input terminal has an active signal.

11. The synchronization circuit of claim 10 wherein said clock trailing edge trigger circuit output terminal is coupled to said clock trailing edge trigger circuit reset output terminal, said clock trailing edge trigger circuit providing an active signal on said clock trailing edge trigger circuit reset output terminal simultaneously with said active signal on said clock trailing edge trigger circuit output terminal.

12. The synchronization circuit of claim 9 wherein said clock leading edge trigger circuit comprises a flip-flop having:

an input terminal, wherein said input terminal is said clock leading edge trigger circuit first input terminal;

a clock input terminal, wherein said clock input terminal is clock leading edge trigger circuit second input terminal;

a reset input terminal, wherein said reset input terminal is said clock leading edge trigger circuit third input terminal; and an output terminal, wherein said output terminal is said clock leading edge trigger circuit first output terminal.

13. The synchronization circuit of claim 10 wherein said clock trailing edge trigger circuit comprises:

an inverter, wherein an input terminal of said inverter is said clock trailing edge trigger circuit first input terminal; and a flip-flop having:

an input terminal, wherein said input terminal is connected to an output terminal of said inverter;

a reset input terminal, wherein said reset input terminal is connected to said output terminal of said inverter;

a clock input terminal, wherein said clock input terminal is said clock trailing edge trigger circuit second input terminal; and an output terminal, wherein said output terminal is connected to said clock trailing edge trigger circuit output terminal.

14. The synchronization circuit of claim 1 wherein said signal generator drives a leading edge on said synchronized signal output terminal in response to a leading edge on said signal generator first input line.

15. A method comprising:

applying an inactive signal to an asynchronous reset terminal of a flip-flop;

applying an input signal to a D input terminal of said flip-flop while said flip-flop is being held in reset by said inactive signal; and applying an active signal to said asynchronous reset terminal after passage of a predetermined time period as measured from the time said input signal is applied;

wherein:

said input signal comprises a leading edge derived from a leading edge in a first signal to be synchronized and wherein said flip-flop is clocked by a second signal to be synchronized;

said first signal is derived from a system bus clock signal, and said second signal is derived from a host adapter integrated circuit clock signal.

16. The synchronization circuit of claim 1, wherein:

said signal input line of said leading edge detector carries a signal derived from a system bus clock signal; and said second input line of said signal generator carries a signal derived from a host adapter integrated circuit clock signal.

17. The synchronization circuit of claim 4 wherein:

said signal generator further comprises a reset output terminal connected to a reset input line of said leading edge detector;

said signal generator drives an active signal on said reset output terminal synchronously with said trailing edge on said synchronized clock output terminal; and said leading edge detector provides an inactive signal asynchronously on said leading edge detector output terminal and on said leading edge detector delayed output terminal on receipt of said active signal on said reset input line.

18. The synchronization circuit of claim 4 wherein said signal generator comprises a clock leading edge trigger circuit, said clock leading edge trigger circuit comprising:

a first input terminal coupled to said signal generator first input line;

a second input terminal coupled to said signal generator second input line;

a third input terminal coupled to said signal generator enable input line; and a first output terminal coupled to said synchronized clock output terminal;

wherein said clock leading edge trigger circuit simultaneously drives a signal on said first output terminal active, and a signal on said second output terminal active in response to a leading edge on said signal generator second input line, if said clock leading edge trigger circuit third input terminal has an active signal.

19. The synchronization circuit of claim 18 wherein said clock leading edge trigger circuit comprises a flip-flop having:

an input terminal, wherein said input terminal is said clock leading edge trigger circuit first input terminal;

a clock input terminal, wherein said clock input terminal is clock leading edge trigger circuit second input terminal;

a reset input terminal, wherein said reset input terminal is said clock leading edge trigger circuit third input terminal; and an output terminal, wherein said output terminal is said clock leading edge trigger circuit first output terminal.

20. The synchronization circuit of claim 18 wherein:

said clock leading edge trigger circuit comprises a flip-flop having an input terminal; and said clock leading edge trigger circuit holds said flip-flop in reset for a predetermined time period while applying to said flip-flop input terminal a signal received at said first input terminal of said clock leading edge trigger circuit.

21. The synchronization circuit of claim 4 wherein said signal generator comprises a clock trailing edge trigger circuit, said clock trailing edge trigger circuit comprising:

a reset output terminal coupled to said signal generator reset output terminal;

a first input terminal coupled to said clock leading edge trigger circuit second output terminal;

a second input terminal coupled to said signal generator second input line; and an output terminal coupled to said synchronized clock output terminal;

wherein said clock trailing edge trigger circuit provides an active signal on said clock trailing edge trigger circuit output terminal in response to a trailing edge on said clock trailing edge trigger circuit second input terminal if said clock trailing edge trigger circuit first input terminal has an active signal.

22. The method of claim 15 wherein said predetermined time period is greater than or equal to a precharging time of said flip-flop.

23. The method of claim 15 wherein said first signal has a pulse width larger than a pulse width of said second signal.

* * * * *